United States Patent
Liberman

[15] 3,683,101
[45] Aug. 8, 1972

[54] CEILING AND WALL STRUCTURES AND ELECTRICAL ENERGY DISTRIBUTING DEVICE FOR USE IN CONNECTION THEREWITH

[72] Inventor: Milton Liberman, 65 Seawana Rd., East Rockaway, N.Y. 11518

[22] Filed: Sept. 9, 1970

[21] Appl. No.: 70,748

[52] U.S. Cl. ............................174/49, 52/28, 52/39
[51] Int. Cl. .............................................H02g 3/29
[58] Field of Search ........174/48, 49; 52/28, 39, 220, 52/221, 495, 656

[56] References Cited

UNITED STATES PATENTS

| | | | |
|---|---|---|---|
| 3,001,001 | 9/1961 | Bibb | 174/48 X |
| 3,146,956 | 9/1964 | Schwartz | 174/49 UX |
| 3,110,754 | 11/1963 | Witort et al. | 174/49 X |
| 2,079,635 | 5/1937 | Sharp | 52/282 X |
| 3,383,811 | 5/1968 | Ades | 52/28 |
| 3,450,871 | 6/1969 | Segil et al. | 52/28 X |
| 3,194,361 | 7/1965 | Thurman | 174/48 UX |

*Primary Examiner*—Lewis H. Myers
*Assistant Examiner*—D. A. Tone
*Attorney*—Eugene E. Geoffrey, Jr.

[57] ABSTRACT

A prewired outlet assembly for use with a suspended ceiling which consists of an elongated channel having spaced wired outlets along its length and means for interlocking it with T-bar for incorporation as part of the ceiling for support of lighting fixtures and ceiling elements so that prewired fixtures can be merely plugged in to the outlets. Provision is also made for the installation of additional prewired channels and vertical prewired columns for cooperation with the ceiling structure and receipt of energy from the outlet assemblies for providing floor outlets for electric appliances. The channels and columns may also include isolated compartments for communication and signalling purposes.

20 Claims, 13 Drawing Figures

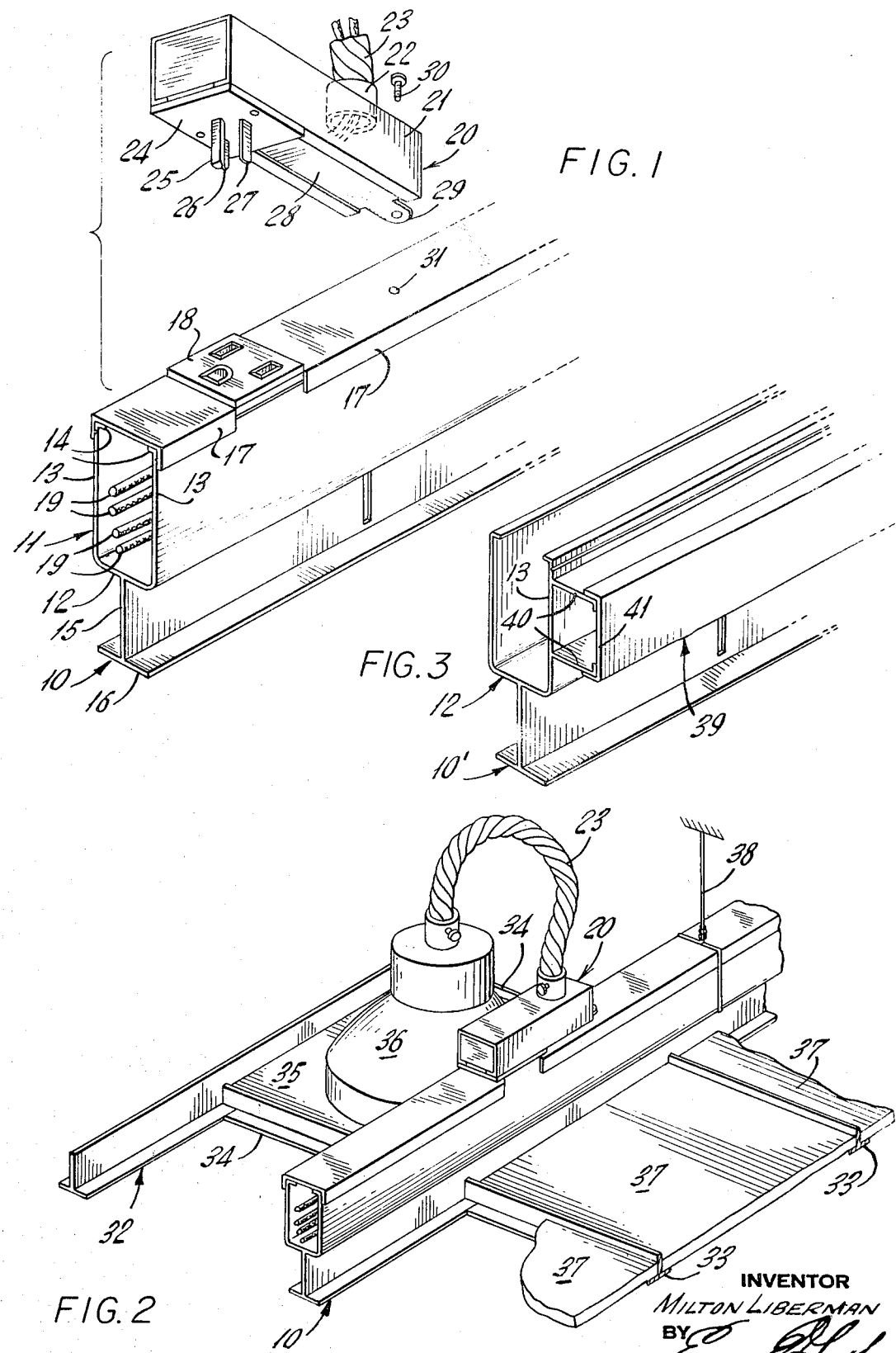

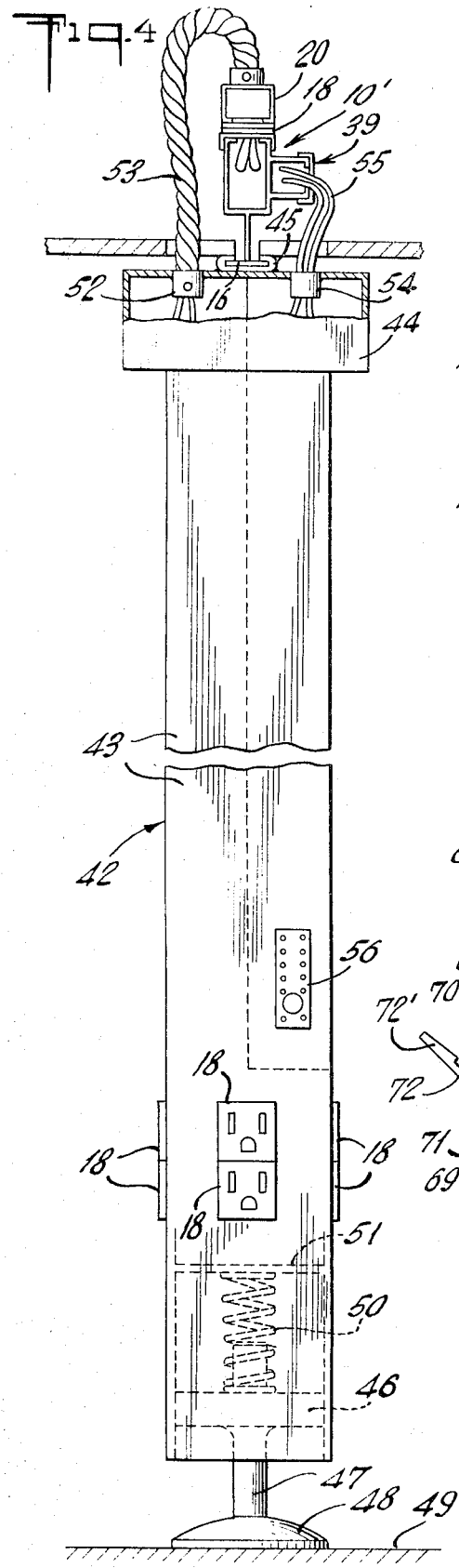
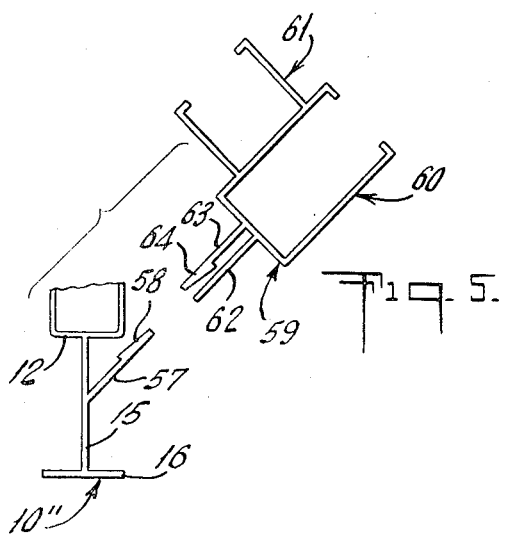
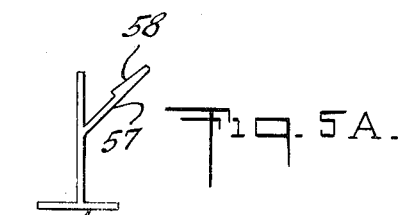
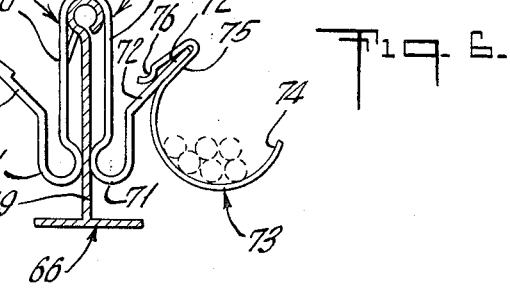

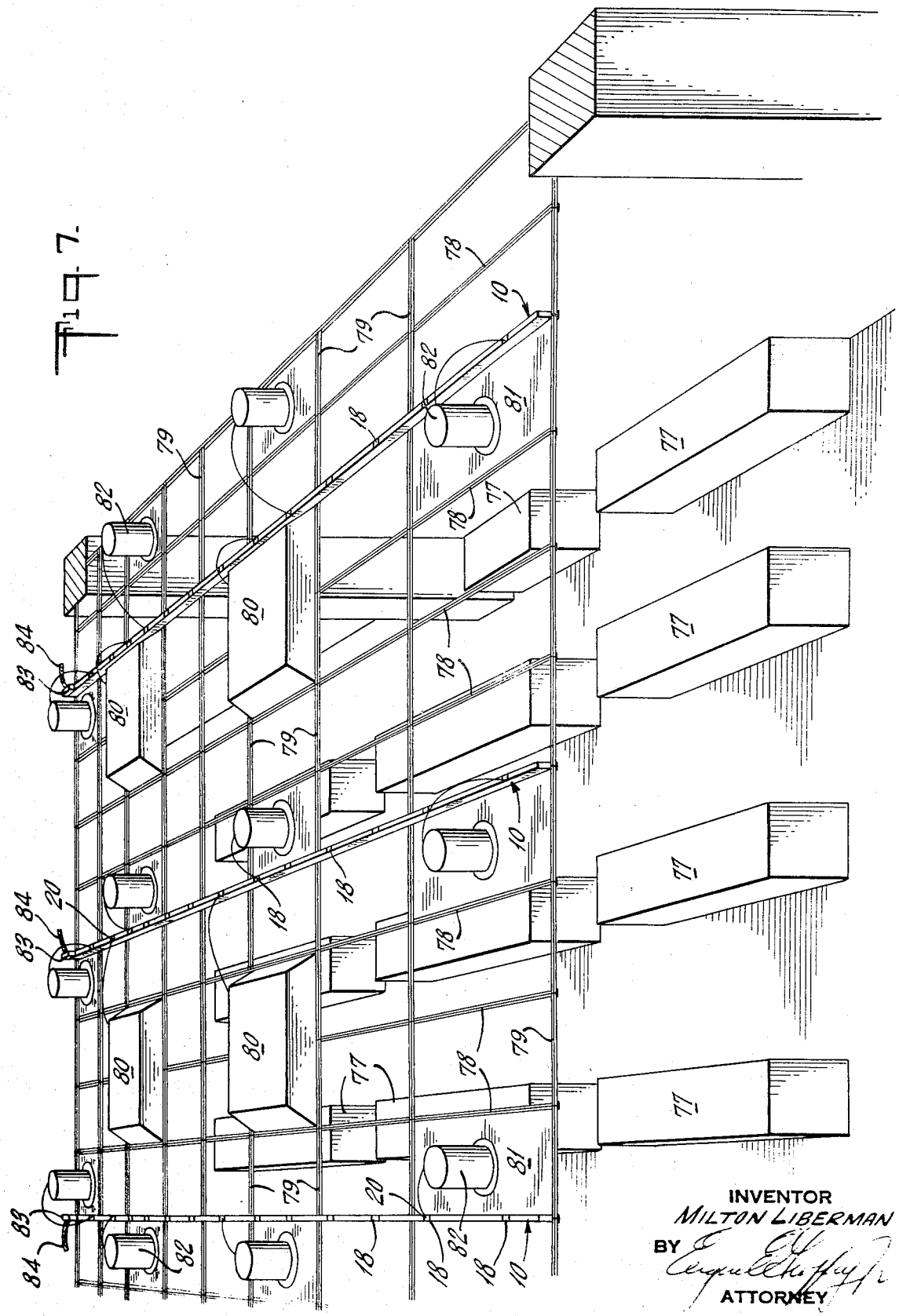

PATENTED AUG 8 1972

INVENTOR
MILTON LIBERMAN
BY
ATTORNEY

CEILING AND WALL STRUCTURES AND ELECTRICAL ENERGY DISTRIBUTING DEVICE FOR USE IN CONNECTION THEREWITH

This invention relates to structures for use in combination with ceilings and walls for the distribution of electrical energy such as electrical power for lighting and other purposes, communication systems and the like and more specifically to improved structural members which may be incorporated as part of the ceiling structure and prewired for supplying energy throughout the ceiling structure as well as to cooperating prewired structures for incorporation in walls, partitions, and the like having outlets for powering appliances and other electrical equipment.

Present procedures for the installation of ceilings in commercial and residential structures usually involve the utilization of so-called "drop ceilings" in order to provide space for the accommodation of recessed lighting fixtures, air conditioning ducts, and wiring for power distribution and communication. Such ceilings also facilitate access to the wiring when required and greatly facilitates rearrangement of the lighting when desired. In the installation of such ceilings conduit or BX cable is generally installed before installation of the ceiling and outlet boxes must be provided at selected positions to facilitate connection of the lighting fixtures. At the same time, wiring for communication systems must be installed at least prior to the final installation of the ceiling tiles and suitably affixed to the building structure. These procedures are obviously costly and time consuming. Furthermore, should outlets be required just above floor level, suitable conduits must be installed either in the walls or on the surface of the walls and in the latter case the conduits materially detract from the decor of the office or other room as the case may be.

This invention provides novel and improved means which overcome the wiring problems heretofore encountered in the installation of drop ceilings through the provision of prewired electrical assemblies which may be installed as an integral part of the ceiling structure and which greatly simplifies the electrical wiring necessary to supply energy to recessed lighting fixtures and other electrical apparatus. The invention further contemplates the provision of prewired lighting fixtures which upon installation are merely plugged in to the prewired assemblies thus avoiding the problems entailed in connecting a lighting fixture directly to an outlet box. In addition, through the utilization of vertical and horizontal prewired structures electrical energy can be supplied to outlets near or at the floor level and at desks, benches, and other work areas to provide energy for electrical appliances and apparatus. The vertical structures are provided with plugs so that they can be energized by merely plugging them in to the nearest outlet on the prewired ceiling assemblies.

By providing the prewired ceiling assemblies and the vertically disposed tubular members with internal partitions, communicating circuits such as telephone wiring and intercommunication wiring can be incorporated as part of the structures.

Another object of the invention resides in the provision of improved inverted T-bars used in the support of drop ceilings which T-bars may be arranged to include means for removably supporting elongated tubular members for supporting electrical energy conductors for power as well as communication.

The invention further contemplates the provision of an improved integrated ceiling structure wherein the ceiling tiles and recessed lighting fixtures are supported by inverted T-bars and wherein prewired elongated tubular members each carrying a plurality of outlets are carried by or formed integrally with ceiling supporting means such as T-bars so that upon installation of the ceiling electrical connections need only be made to one end of each of the prewired structures to energize the entire ceiling. The lighting fixtures whether they be of the recessed type or otherwise secured or supported by the drop or suspended ceiling are provided with plugs for engagement with one of the outlets in order to energize the fixtures. The fixtures would therefore preferably be prewired with plugs so that they can be quickly and easily connected with the source of energy.

Another object of the invention resides in the provision of novel and improved elongated prewired tubular members embodying means for incorporating them as an integral part of the drop ceiling and having a plurality of outlets for supplying energy for electrical devices.

Still another object of the invention resides in the provision of novel and improved tubular members depending from the ceiling to provide wiring for electrical energy and communication systems at points adjoining the floor level. Such vertical tubular members may also embody means for engaging and being incorporated as part of a wall or partition which thus eliminates the need for complicated and sometimes unsightly wiring particularly when arranging or rearranging work areas in offices and other types of commercial establishments.

The above and other objects of the invention will become more apparent from the following description and accompanying drawings forming part of this application.

In the drawings:

FIG. 1 is a perspective view of a portion of a prewired electrical assembly including ceiling supporting means in accordance with the invention and a perspective view of a plug for engaging the outlet on the electrical assembly in order to energize a lighting fixture or other appliance;

FIG. 2 is a perspective view of a fragmentary portion of a ceiling structure embodying the prewired electrical assembly illustrated in FIG. 1;

FIG. 3 is a perspective view of a modification of the prewired electrical assembly shown in FIG. 1 which incorporates an auxiliary wireway for enclosing additional electrical conductors as for instance electrical conductors for communication purposes;

FIG. 4 is a side elevational view in partial section of a vertically disposed prewired tubular member for cooperation with the prewired electrical assembly illustrated in FIGS. 1 and 2 for providing electrical energy to outlets adjoining the floor level for the supply of power and providing connections for communication equipment;

FIG. 5 is an end view of a modified embodiment of the structure shown in FIG. 1 for providing auxiliary wiring channels for incorporation as part of a ceiling structure;

FIG. 5A is an end view of a T-bar having means extending from one side thereof for supporting auxiliary wiring channels such as that illustrated in FIG. 5;

FIG. 6 is an end view of a clip for engaging a T-bar and having means for supporting auxiliary wiring channels;

FIG. 7 is a perspective view of the top of a ceiling utilizing prewired electrical ceiling supporting assemblies in accordance with the invention;

Figure 8:
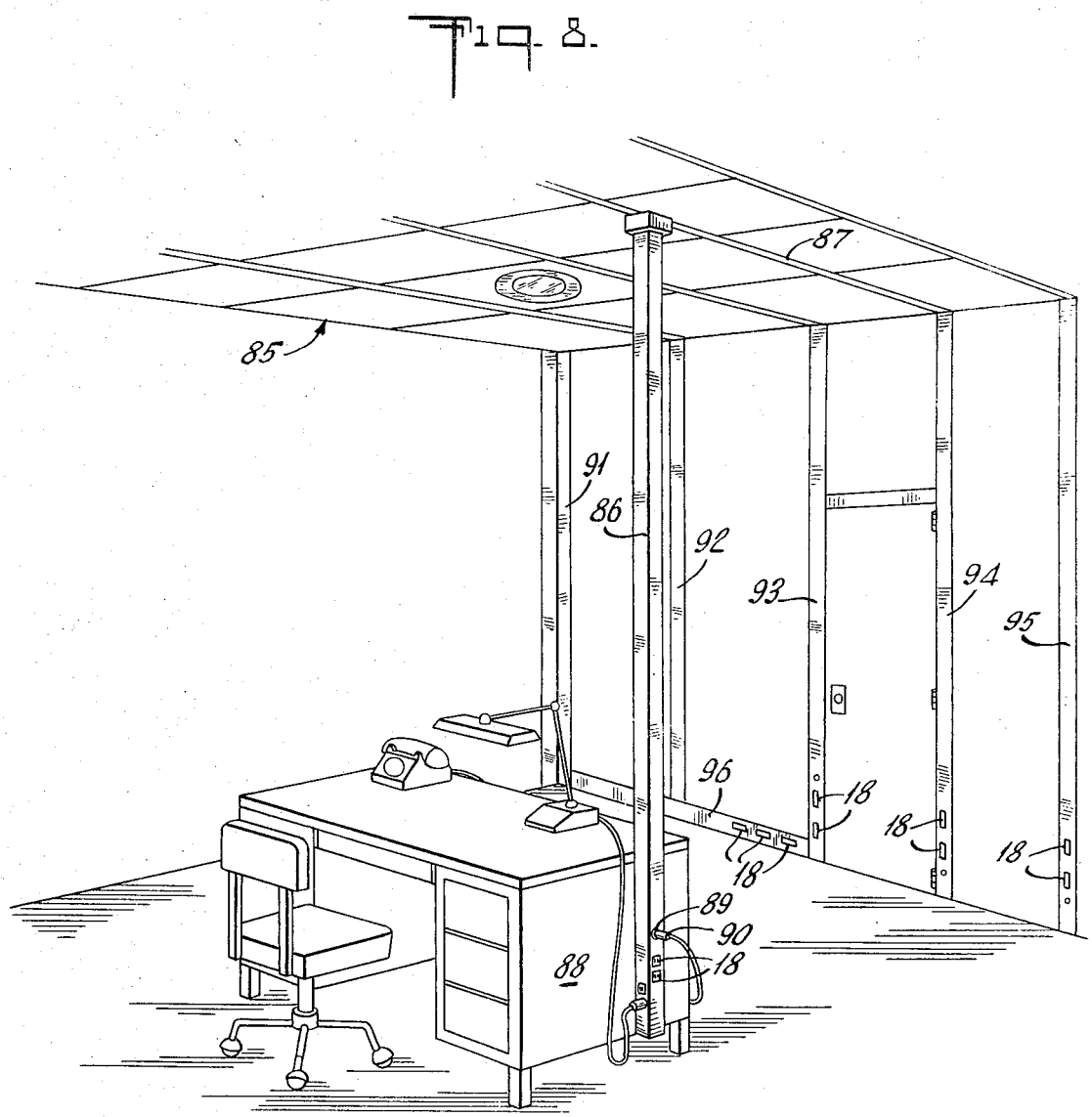

FIG. 8 is a perspective view of a room embodying a ceiling utilizing prewired electrical assemblies in accordance with the invention and prewired vertically disposed tubular members for supplying electrical energy and communication outlets to desks or other work areas and for incorporation as part of a wall or partition; and FIGS. 9 through 12 are cross-sectional views of prewired vertical members for incorporation in walls or partitions for providing electrical energy to outlets adjoining the floor level as illustrated in FIG. 8.

As previously pointed out, drop or suspended ceilings generally utilized inverted T-shaped elements supported by wires or rods from the building structure with the T-shaped elements being positioned in predetermined parallel spaced relationship both longitudinally and laterally and interlocked to provide openings of predetermined sizes for insertion of ceiling tiles and recessed lighting fixtures. In order to provide electrical energy for the lighting fixtures, conduits or BX cable had to be installed with outlet boxes at each lighting fixture location to permit connection of the lighting fixtures. Similarly electric wiring for communication and other purposes was also generally installed and affixed to the structure of the building prior to the ceiling installation. The improved apparatus in accordance with this invention avoids the need for the extensive electric wiring on location and provides factory prewired ceiling supporting assemblies or structures which are installed in place of conventional T-bars and which may be quickly and easily connected to the electrical power system of the building to provide energized outlets at spaced positions throughout the ceiling area. By providing lighting fixtures or other electrical devices with prewired cooperating plugs, the devices can be merely plugged into the nearest outlet when installed in the ceiling. The invention further contemplates prewired vertical columns secured at the upper end to a T-bar and at the lower end to a desk or floor to provide outlets at floor level. Such vertical members are provided with appropriate prewired plugs so that upon installation they can be merely plugged into the nearest receptacle in the ceiling. As will be shown, the system also facilitates the installation of prewired tubular structures for communication systems and other purposes.

Referring now to the drawings and more specifically to FIGS. 1 and 2, the prewired T-bar and outlet assembly is generally denoted by the numeral 10 and comprises an upwardly opening channel structure 11 having a bottom wall 12, upwardly extending legs 13 and inwardly extending flanges 14 on the upper ends of the legs 13. The bottom wall 12 has a dependent wall 15 terminating in a transverse wall 16 so that the walls 15 and 16 form an inverted T structure which is generally referred to in the trade as a T-bar. The upper side of the channel structure 11 is closed by covers 17 and intervening outlets 18. While the outlets 18 may be of any desired type or configuration, an outlet of the type illustrated and described in U.S. Pat. No. 3,500,284, is particularly useful since it has recesses along opposite sides thereof which engage the inwardly extending flanges 14 to secure the outlet in position. The conductors 19 of which only four are illustrated are connected to the outlets 18 and the number of conductors in any one of the channels 11 would be determined by the number of outlets and the particular type of outlet control required.

The structure or assemblies 10 may be made of any desired length and would normally be of a length corresponding to the length of a bay in a building or the length of a room in which the ceiling is to be installed. As will be shown, the electric cables supplying the energy to the conductors 19 can be readily and easily connected to a suitable junction box at one end of the structure 10. Furthermore, any number of structures 10 may be utilized in a single ceiling section depending on the number of outlets 18 required and the number of outlets on each structure. In connection with fixtures intended to be supported by the ceiling whether recessed or pendant, such fixtures may be provided with plugs such as the plug generally denoted by the numeral 20 which in the illustrated embodiment comprises a housing 21 having a connector 22 extending from the top side thereof for attachment of the BX cable 23. The bottom side of the housing is closed by an insulating plate 24 having prongs 25, 26, and 27 for engagement for corresponding openings in the outlet 11. The remainder of the bottom of the housing is closed by a plate 28 having a perforated ear 29 to receive screw 30 which extends through the ear 29 and engages an opening 31 in the cover plate 17. In this way the plug is fixedly secured in place and cannot become accidentally disengaged.

FIG. 2 shows a fragmentary section of a ceiling structure embodying the T-bar and outlet assembly 10 in accordance with the invention. The structure 10 is disposed in parallel relationship with a conventional T-bar generally denoted by the numeral 32 and transverse T-bars 33 and 34 are positioned at predetermined spaced parallel intervals between and interlocked with the structure 10 and the T-bar 32 in any suitable manner. A ceiling tile 35 carrying a lighting fixture 36 is positioned between the T-bars 34 and BX cable 23 carrying the conductors connects the lighting fixture 35 to the plug 20 as previously described to energize the fixture. Other portions of the ceiling may merely be closed by conventional tiles generally denoted by the numeral 37. The T-bar and outlet assembly 10 as well as the conventional T-bars 32, 33, and 34 are all secured to the building structure by suitable rods or wires such as the wire 38. The supporting arrangement is well-known and a detailed description is not deemed necessary.

A modified embodiment of the invention is illustrated in FIG. 3. The basic T-bar and outlet assembly is generally denoted by the numeral 10' and includes a wiring channel 39 carried by one leg 13 of the channel member 12. The wiring channel includes upper and lower legs 40 and a cover member 41. The wiring channel 39 would normally be used for communication purposes though it may be utilized to house power conductors of a voltage differing from the voltage of the conductors 19 which may be disposed within the channel structure 12. In the latter case the channel 39 may also include outlets 18 in the same manner as described in connection with the structure 10.

In many instances it is necessary to provide power outlets adjoining the floor level and at the same time provide connections for telephones and other communicating equipment. For this purpose a prewired column which may be of rectangular or other suitable cross-section may be provided and interconnected with the T-bar and outlet assembly 10 or 10' as the case may be. One embodiment of such a prewired column is illustrated in FIG. 4 and the column structure is generally denoted by the numeral 42. It constitutes an elongated tubular structure 43 having a slightly enlarged housing 44 on the top thereof. The housing 44 includes a suitable clip 45 firmly engaging the horizontal plate 16 on the T-bar and outlet assembly 10'. The bottom end of the column includes a spring-loaded assembly comprising a piston 46 slidably engaging the column 43 and connected via a post 47 to a suitable footing 48 frictionally engaging the floor 49. A spring 50 is interposed between the piston 46 and a wall 51 within the housing to urge the foot 48 firmly against the floor. The top surface of the housing 44 has a connector 52 for attachment of a cable 53 having a plug 20 on the end thereof for engaging an outlet 18. In addition, a second connector 54 may be provided for communication conductors 55 which are fed into the channel assembly 39 and connected at the lower portion of the column to a suitable outlet 56. The conductors within the BX cable 53 would be connected with outlets 18.

A further modification of the T-bar and outlet assembly in accordance with the invention is illustrated in FIG. 5. The modified structure is generally denoted by the numeral 10'' and includes the channel structure 12, the depending wall 15 and the transverse bottom wall 16. The depending wall 15 includes an inclined flange 57 having a tapered portion 58 on one side thereof. The flange 57 supports an additional wiring structure generally denoted by the numeral 59 which comprises a main wiring channel 60 and a secondary wiring channel 61. These channels may be formed integrally one with the other and may include accessible outlets and covers. The wiring channel 60 has a pair of outwardly extending substantially parallel flanges 62 and 63 with the flange 63 having a tapered offset portion 64. The flanges 62 and 63 receive the flange 57 therebetween and the tapered portions 58 and 64 interlock one with the other to hold the assembly 59 firmly in position on the flange 57. A similar arrangement may also be included as part of a conventional T-bar as illustrated in FIG. 5A. In this figure the T-bar is generally denoted by the numeral 65 and includes an inclined flange 57 and a tapered portion 58 similar to corresponding elements described in connection with FIG. 5. The modified T-bar structure 65 would therefore be able to receive and support a suitable wiring channel assembly such as the assembly 59 as shown in FIG. 5.

In certain instances it may be desirable to arrange the inclined flanges 57 in FIGS. 5 and 5A as separate structures for attachment to a conventional T-bar and such an arrangement is illustrated in FIG. 6. In FIG. 6 the conventional T-bar is generally denoted by the numeral 66 and the cooperating clip is generally denoted by the numeral 67. The clip 67 may be of any suitable length to provide adequate strength to support auxiliary wiring receiving structures and consists of a U-shaped element 68 bridging the vertical wall 69 of the T-bar 66 and having a pair of downwardly extending legs 70. The lower portion of each leg is provided with a semi-circular portion 71 which bears against the side of wall 69, then extends upwardly and terminates in an inclined flange-like portion 72 which is substantially identical in structure to the inclined flange 57 of FIGS. 5 and 5A. The tapered portion 72' may receive a wiring assembly such as the wiring assembly 59 of FIG. 5 or may receive and support a semi-circular channel generally denoted by the numeral 73 in FIG. 6. The channel 73 includes an arcuate portion 74 terminating in a U-shaped clip 75 having an offset portion 76 to engage the shoulder of the tapered section 72' of the inclined flange 72. The clip 67 may either be formed of an extruded metal such as aluminum or the like or formed of steel or other suitable material.

FIG. 7 is a semi-diagrammatic top view of a drop or suspended ceiling embodying T-bar and outlet assemblies in accordance with the invention. For purposes of illustration the ceiling tiles not carrying lighting fixtures have been omitted in order to view the show cases 77 which would normally carry merchandise to be illuminated by the lighting equipment. It will be observed that the ceiling includes three T-bar and outlet assemblies 10 as previously described and each carries a plurality of outlets 18. Between the T-bar and outlet assemblies 10 are conventional T-bars 78 which are disposed in parallel spaced relationship one with the others and with the T-bar and outlet assemblies 10. Transverse T-bars 79 are positioned in spaced parallel relationship and suitably interconnected in a conventional manner with the T-bars 78 and the T-bar and outlet assemblies 10. The spacings between the T-bars are generally arranged to provide 2 foot by 2 foot openings or 2 foot by 4 foot openings as may be desired. The 2 foot by 4 foot openings in the instant illustration accommodate recessed fluorescent fixtures 80, each of which is provided with a cable and cooperating plug 20 for engagement with one of the outlets 18. The 2 foot by 2 foot openings are provided with ceiling tiles 81 each carrying a recessed high-hat fixture 82 which is also connected by a cable and plug 20 to an adjoining outlet 18. The end of each T-bar and outlet assembly is provided with a box 83 for attachment of a power supplying cable 84.

It is apparent from the foregoing description that the installation and wiring of the fixtures is greatly simplified since electrical connections are made at one end of the outlet assemblies 10 and electrical outlet boxes need not be provided at each fixture position. Furthermore, prewiring of the outlet assemblies 10 can be accomplished at the point of manufacture utilizing mass production techniques with the result that costs are very substantially reduced and a more versatile ceiling assembly is provided. It is also evident from FIG. 7 that structures such as those shown in FIGS. 5 and 5A and 6 can be incorporated in the event additional wiring for power or communications may be required.

FIG. 8 is a fragmentary section of an office provided with an improved ceiling assembly generally denoted by the numeral 85 in accordance with the invention and having vertical column 86 similar to the column illustrated in FIG. 4. In the instant illustration column 86 is affixed at the upper end to a T-bar member 87 and at the lower end to the side of the desk 88. The lower portion of the column 86 includes outlets 18 for power and a receptacle 89 for receiving a telephone plug 90.

The vertical columns such as the column 86 of FIG. 8 and the column 42 of FIG. 4 may form part of walls or partitions for bringing electrical energy and communication wiring to the floor level. In FIG. 8 the columns 91 through 95 are all tubular members integrated with intervening wall sections to form a partition and are prewired to provide outlets such as the outlets 18 at the lower ends of the columns 93, 94, and 95. A horizontal tubular base member 96 may also be provided and fed by conductors extending through either the columns 91 or 92 to energize the outlets 18 on the horizontal tubular base member 96. The columns 91 through 95 which are prewired would include cable and plug assemblies such as illustrated in FIG. 1 and FIG. 4 so that they may be readily plugged into a ceiling outlet assembly 10 as previously described.

FIGS. 9 through 12 are diagrammatic views of cross-sections of various types of columns and tubular base members that may be employed.

Figures 9, 10:
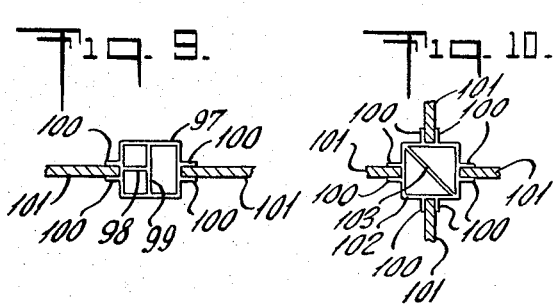
Figures 11, 12:
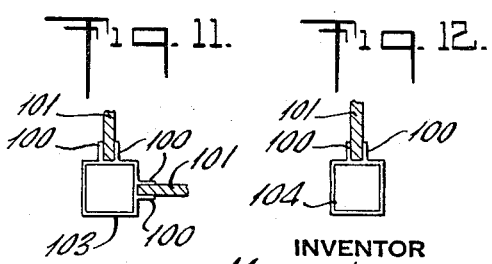

In FIG. 9 the column is denoted by the numeral 97 and has partitions 98 and 99 to accommodate different types of wiring. Sets of spaced flanges 100 extend from opposite surfaces of the column 97 to accommodate wall board or other partitioning material 101. FIG. 10 illustrates a corner column 102 having four sets of spaced flanges 100 to accommodate the partition material 101. If desired, the space within the column 102 may be divided by a diagonal partition 103 in place of the partitions 98 and 99 in column 97. FIG. 11 illustrates a corner column 103 having spaced flanges 100 on two adjoining faces to accommodate partitioning material 101. FIG. 12 illustrates a tubular base member 104 which is similar to the base member 96 of FIG. 8. The structure of FIG. 12 includes a single pair of spaced flanges on the upper surface thereof to accommodate the partitioning material 101. It is evident from FIGS. 9 through 12 that while flanges 100 have been illustrated, any other type of fastening means may be utilized to interconnect the various columns with the intervening partitioning material whether it be of wood, metal, building block or other suitable material.

While only certain embodiments of the invention have been illustrated and described, it is apparent that alterations, modifications and changes may be made without departing from the true scope and spirit thereof as defined by the appended claims.

What is claimed is:

1. A power supplying duct for ceiling structures comprising an elongated hollow structure an inverted T-shaped member secured to and depending from the underside of said hollow structure, a plurality of electric outlet receptacles carried by said hollow structure and spaced along the length thereof, said receptacles having terminal portions disposed within said hollow structures, a plurality of electric wires within said hollow structure and interconnected with said receptacle terminals and means on at least one end of said hollow structure for coupling said wires to a power source.

2. A power supplying duct for ceiling structures according to claim 1 wherein said hollow structure includes at least two elongated isolated compartments for accommodating electric conductors carrying different types of electrical energy.

3. A power supplying duct for ceiling structures according to claim 1 including attaching means positioned along the length of said duct for removably securing a second elongated hollow structure in substantially parallel relationship to the first said elongated hollow structure.

4. A power supplying duct for ceiling structures according to claim 1 wherein said elongated hollow structure includes a bottom, a pair of upwardly extending side walls, said electric outlets being carried by the upper ends of said side walls and cover plates closing the areas between successive outlets and said inverted T-shaped member depends from said bottom wall.

5. A power supplying duct for ceiling structures according to claim 4 including attaching means positioned along the length of said duct for removably securing a second elongated hollow structure in substantially parallel relationship to the first said elongated hollow structure.

6. A power supplying duct for ceiling structures according to claim 1 wherein said inverted T-shaped member includes a plurality of openings to engage T-bars disposed transversely of said power supplying duct to form rectangular openings for receiving ceiling tile and lighting fixtures.

7. A power supplying duct for ceiling structures according to claim 6 wherein said ceiling structure includes a plurality of T-bars positioned in spaced parallel relationship to said power supplying structure, a plurality of T-bars positioned transversely of and interconnected with said power supplying structure and the first said T-bars to form a plurality of rectangular openings, ceiling tiles positioned in certain of said openings, lighting fixtures positioned in other of said openings and electric cables connected to said fixtures and having plugs for engaging said outlets to energize said fixtures.

8. A power supplying duct for ceiling structures comprising an elongated hollow structure for accommodating electrical conductors, and an inverted T-shaped member depending from the underside of said hollow structure, attaching means positioned along the length of said duct for removably securing a second elongated hollow structure in substantially parallel relationship to the first said elongated hollow structure, said attaching means being carried by said T-shaped member and extending outwardly therefrom.

9. A ceiling structure comprising at least one power supplying duct having an elongated hollow structure for accommodating electrical conductors, horizontally disposed flanges secured to and extending from the bottom of said hollow structure and electric outlet receptacles carried by said structure, a plurality of T-bars positioned in spaced parallel relationship to said power supplying duct, a second plurality of T-bars positioned in spaced parallel relationship and transversely of the first plurality of T-bars, said second plurality of T-bars being interlocked with said first plurality of T- bars and said power supplying duct to form a plurality of rectangular openings to support ceiling tile and electrical devices such as lighting fixtures, said electrical devices being interconnected with said outlets for the supply of energy to said fixtures.

10. A ceiling structure comprising at least one power supplying duct having an elongated hollow structure for accommodating electrical conductors, horizontally disposed flanges secured to and extending from the bottom of said hollow structure and electric outlet receptacles carried by said structure, a plurality of T-bars positioned in spaced parallel relationship to said power supplying duct, a second plurality of T-bars positioned in spaced parallel relationship and transversely of the first plurality of T-bars, said second plurality of T-bars being interlocked with said first plurality of T-bars and said power supplying duct to form a plurality of rectangular openings to support ceiling tile and electrical devices such as lighting fixtures, said electrical devices being interconnected with said outlets for the supply of energy to said fixtures, a vertically disposed tubular member, means on the upper end of the last said member securing it to one of said T-bars, means fixedly supporting the lower end of said tubular member, outlets carried by said member and electric conductors within said member and connecting the last said outlets with said outlets on said power supplying duct.

11. A ceiling structure according to claim 10 wherein said vertical tubular member is compartmentized to accommodate conductors carrying different types of electric energy.

12. A ceiling structure according to claim 10 wherein said vertically disposed tubular member includes means extending along at least one side thereof for attachment to a wall.

13. A ceiling structure according to claim 10 wherein said tubular member includes a pair of spaced parallel outwardly extending members on at least one surface thereof and extending substantially throughout the length of said tubular member for receiving a vertical edge of a wall element therebetween.

14. A power supplying duct for ceiling structures comprising an elongated hollow structure for accommodating electrical conductors, electric outlets carried by said structure and connected to said conductors and means carried by said structure for supporting adjoining ceiling elements, outwardly extending longitudinally disposed flange means carried by said duct and an auxiliary prewired hollow member having means extending therefrom engaging said flange means to support the last said member.

15. The combination with a ceiling structural element for support of ceiling tiles and lighting fixtures of outwardly extending longitudinally disposed flange means and an electric conductor carrying member having means engaging said flange means to support the last said member.

16. The combination with a ceiling structural element for support of ceiling tiles and lighting fixtures of outwardly extending longitudinally disposed flange means and an electric conductor carrying member having means engaging said flange means to support the last said member, said flange means being formed integrally with said ceiling structural element.

17. The combination with a ceiling structural element for support of ceiling tiles and lighting fixtures of outwardly extending longitudinally disposed flange means and an electric conductor carrying member having means engaging said flange means to support the last said member, said flange means being carried by a clip removably engaging said ceiling structural member.

18. A prewired vertical energy supplying column comprising an elongated tubular member, means at the upper end of said member for engagement with ceiling structural member, means on at least the other end of said column for fixing it in a vertical position, at least one electric outlet carried by said column and electrical conductors connected to said outlet means and terminating at the upper end thereof in a plug for attachment to a ceiling outlet.

19. A prewired vertical energy supplying column according to claim 18 wherein said tubular member includes means along at least one side thereof for engaging adjoining wall elements.

20. A prewired vertical energy supply column according to claim 18 wherein said elongated tubular member terminates at its lower end in a horizontal tubular member, said electrical conductors in the first said elongated tubular member extending into said horizontal tubular member and electrical outlet receptacles carried by said horizontal tubular member and interconnected with said conductors.

* * * * *